March 19, 1968     A. M. STAUBLY     3,373,522

CONTAINER

Filed June 7, 1965

INVENTOR.

Alan M. Staubly ered Mar. 19, 1968

3,373,522
CONTAINER
Alan M. Staubly, 4940 Colfax Ave.,
Minneapolis, Minn. 55409
Filed June 7, 1965, Ser. No. 461,616
9 Claims. (Cl. 43—55)

ABSTRACT OF THE DISCLOSURE

A closure for a conventional minnow bucket that may be quickly attached to and removed from the wall around the opening therein. The closure has an opening there through and has a plurality of button-shaped support members around the periphery of the opening. One set of rubber bands is stretched across the opening and engages one or more of the members on opposite sides of the opening and lies in one plane, and a second set of rubber bands is similarly stretched across the opening generally at right angles to the first set and lies in a second plane. Quick-connect fastening means is provided which does not materially interfere with the continued use of the regular cover as a supplemental closure. By lying in different planes and at right angles to each other, the two sets of bands permit the insertion of one's hand through the bands without enlarging any of the adjoining holes in more than one direction, which leaves the bands in the other direction to keep the holes between the bands sufficiently small to prevent the escape of frogs or other types of bait therefrom.

---

This invention relates to a container for live fishing bait and, more particularly to a closure for a minnow bucket that enables the bucket to be used for containing frogs or the like without the risk of having them escape as they do when a conventional minnow bucket is used for this purpose. Since frogs and grasshoppers can leap higher than a bucket is deep, every time the lid is raised, there is a good chance that one or more of the bait will try to leap out of the opening. This invention is to provide means that may be used alone over the opening of a bucket or in conjunction with the lid usually provided thereon, to prevent the escape of the bait confined in the bucket.

Various objects of the invention will become apparent upon reading the following description of the invention in conjunction with the accompanying drawing wherein.

Figure 1:
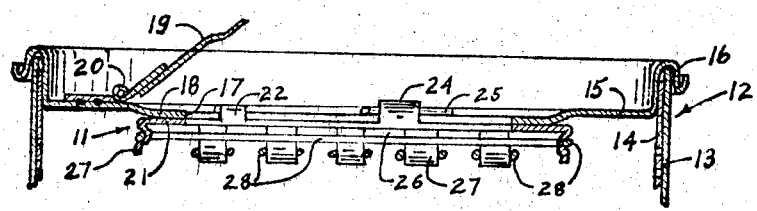
FIGURE 1 is a vertical sectional view through the upper portion of a minnow bucket embodying the invention.
Figure 2:
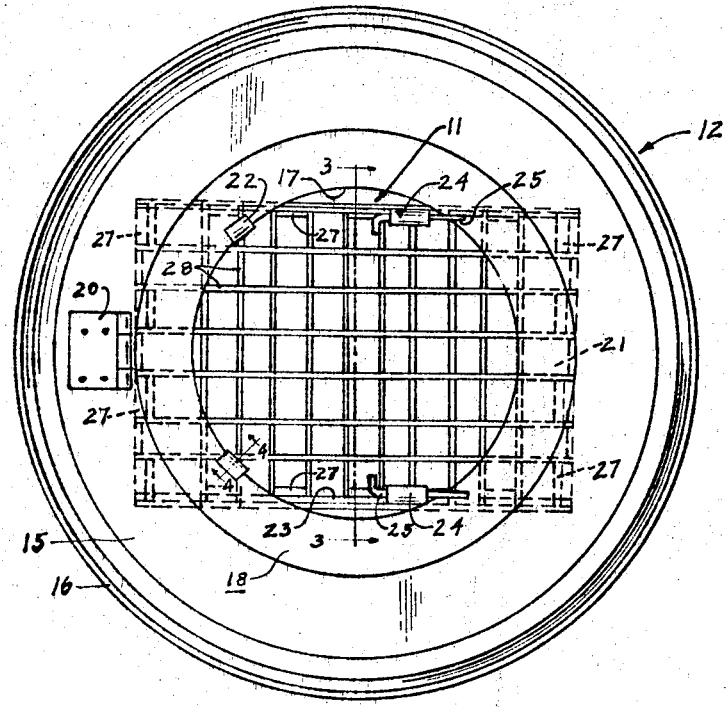
FIGURE 2 is a plan view thereof, with the lid removed.

Referring to FIGURE 1 of the drawing, the invention is illustrated as an attachment 11 adapted to be secured to a conventional minnow bucket 12 having an outer imperforate container 13 and an inner perforated container 14. The top of the inner container is closed with a disk-shaped cover 15 that has a looped portion 16 that fits over and rests upon the upper edge of the outer container.

The cover has a central opening 17 surrounded by an annular offset wall portion 18 that is adapted to receive a lid 19 that is connected to the cover by means of a hinge 20. The hinge is connected to the cover by any suitable means, such as by welds.

The invention lies in the provision of means on or in association with the cover 15 to substantially close the opening 17 when the lid is raised, which means will enable one's hand to be inserted into the chamber inside the container 14 and withdrawn from the chamber without leaving an opening large enough for an object to get out in the process. This means may take several forms, two of which are illustrated in the drawings. One consists of a rectangular sheet of material 21 providing a wall portion, such as metal, which is shaped into a wall portion that is less wide than the diameter of the opening 17, so that it may be inserted through the opening and positioned against the inner surface of the cover 15. Hook shaped tabs 22 are formed on the inner edge of an opening 23 that is flat on two sides and arcuate at each end. The length of the opening is approximately equal to the diameter of opening 17. Each of the two sides has a loop 24 extending upwardly through the opening 17 with one end thereof close to or in abutting relationship with the edge of the opening 17, when the tabs are hooked over the portion 18 as illustrated in the drawing. A slide bolt 25 is provided in each of the loops 24 to hold the attachment in assembled relationship when it is positioned over the top surface of the portion 18 of the cover.

The long sides of the attachment has a skirt portion or flange 26, with downwardly extending hook-shaped fingers 27, while the short sides have only the downwardly extending hook-shaped fingers providing first and second support means. As illustrated, the long sides have five fingers and the short sides have four fingers. Obviously, the number and shape of the fingers may be varied, depending upon the need. The hoops on the fingers on the long sides lie in a plane below the hooks on the other sides.

Ordinary rubber bands 28 are positioned around each opposing pair of fingers, five one way and four the other, to form a grill of elastic or stretchable strands. All of the bands extending in one direction have the longitudinal axes of their strands lying in one plane while the longitudinal axes of the strands of the other bands lie in another plane. Obviously, the grill pattern may be varied by extending the rubber bands between unopposed fingers.

The attachment 11 could be secured to the cover 15 from either above or below it, by means of spring fingers that can snap through the hole 17 and resiliently hold the attachment in place in a conventional manner.

Figure 5:
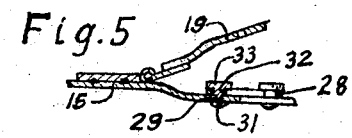
FIGURE 5 is a fragmentary sectional view of a modification of the invention.
Figure 3:
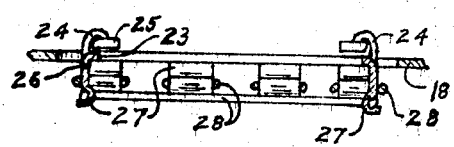
FIGURE 3 is a sectional view taken along line 3—3 of FIGURE 2.
Figure 6:
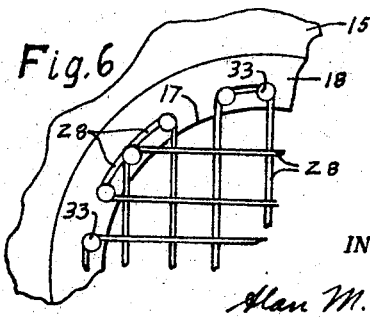
FIGURE 6 is a fragmentary plan view of the modification.
Figure 4:
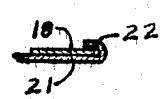
FIGURE 4 is a sectional view taken along line 4—4 of FIGURE 2.

Rather than applying the invention as an attachment to a minnow bucket, it could be built into the bucket as original equipment in the form shown in FIGURES 5 and 6, or some similar equivalent form. As illustrated, rivets 29 have replaced the fingers 27. The rivets have a small diameter portion that extends through slightly larger holes 30 in the cover and are headed over at 31 to hold them in place. The rivets have an enlarged diameter portion 32 that provides an abutment shoulder opposite the headed over portion 31, to clamp the cover therebetween. A head 33 at the end of the portion 32 serves as a rubber band retainer when the rubber bands 28 are wrapped around opposed pairs of rivets.

By reversing the cover 19 and its conventional latch, as illustrated in FIGURE 5, space is provided for the heads of the rivets and the rubber bands so that the cover may be closed in the usual manner.

The attachment is applied to the containers 14 by inserting it through the opening 17, turning it nearly parallel to the cover, sliding the hooks 22 over the lip of the cover at opening 17, lifting the loops 24 through the opening and then sliding the bolts 25 over the portion 18 of the cover. This locks the attachment in place. With the rubber bands in place, and frogs, for example, within the container, one's hand may be inserted generally centrally of the opening by inserting the index or last finger into one of the small openings between the rubber bands and then by flexing the bands transversely of their axes, the other fingers and the entire hand may be sequentially extended into the container. In making the hand insertion the rubber bands flex so as to prevent a sufficiently large hole from developing around the hand or elsewhere as to enable bait to escape. After grasping a bait, the hand may be withdrawn also without causing a large opening hole to be formed between the rubber bands.

While I have described the preferred embodiments of the invention, it is obvious that other modifications may be made therein without departing from the spirit of the invention. Therefore, the scope of the invention should be determined from the accompanying claims wherein I claim:

1. A closure for a container comprising a wall portion with an access opening provided therein, first and second opposed support means on said wall portion extending substantially around said opening, elastic strand means including a first plurality of strands with their longitudinal axes spaced apart and extending between and engaging said first opposed support means and lying in a first common plane and a second plurality of strands with their longitudinal axes spaced apart and extending between and engaging said second opposed support means and lying in a second common plane with said second strands being substantially at right angles to said first strands, whereby a hand may be inserted through said access opening and between the elastic strands.

2. A closure as defined in claim 1 wherein said wall portion and support means and strands are quickly detachable from and attachable to the container as an assembly by suitable means.

3. A closure as defined in claim 1 wherein pairs of said elastic strands consist of conventional rubber bands and the strands in each plane are generally parallel.

4. A closure as defined in claim 2 wherein said wall portion is so shaped that it is insertable through an opening in a conventional container with a conventional closure and securable to the container by means that provide for the continued and additional use of the conventional closure.

5. A closure as defined in claim 1 wherein said wall portion is mountable on the container and has means for quickly securing said wall portion to said container so as to permit a conventional closure for said container to continue to so function along wtih the first mentioned closure.

6. A closure as defined in claim 2 wherein said suitable means includes two fixed hook-shaped means and at least one adjustable means.

7. A closure as defined in claim 1 wherein the space between adjacent parallel strands is small enough to prevent objects confined in the container from escaping therefrom even while some of the strands have been spread apart an additional amount by an object extending through the two planes of strands.

8. A closure as defined in claim 1 in combination with a container of the conventional minnow bucket type wherein said closure in operative position is so constructed as to not materially interfere with the continued use of a conventional closure on the container to provide a double closure for the container.

9. A closure as defined in claim 1 wherein said elastic strand means are removably secured to said support means.

References Cited
UNITED STATES PATENTS

| | | | |
|---|---|---|---|
| 1,490,868 | 4/1924 | Voell | 43—55 |
| 2,542,640 | 2/1951 | Dixon | 206—12 |
| 2,597,002 | 5/1952 | Johnson et al. | 43—55 |
| 3,143,263 | 8/1964 | Farmer | 224—5 |

HUGH R. CHAMBLEE, *Primary Examiner.*